(12) United States Patent
Elsdon et al.

(10) Patent No.: US 11,784,858 B1
(45) Date of Patent: Oct. 10, 2023

(54) COORDINATED COMMUNICATION IN AN ELECTRONIC SYSTEM

(71) Applicant: Microsoft Technology Licensing, LLC, Redmond, WA (US)

(72) Inventors: Joshua Aidan Elsdon, Bellevue, WA (US); Salim Sirtkaya, Redmond, WA (US); David John McKinnon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/656,630

(22) Filed: Mar. 25, 2022

(51) Int. Cl.
*H04L 25/03* (2006.01)
*B60K 35/00* (2006.01)
*H04L 43/106* (2022.01)
*G01P 15/18* (2013.01)
*G01C 19/00* (2013.01)

(52) U.S. Cl.
CPC ........ *H04L 25/03993* (2013.01); *B60K 35/00* (2013.01); *H04L 25/03828* (2013.01); *H04L 43/106* (2013.01); *B60K 2370/152* (2019.05); *B60K 2370/589* (2019.05); *G01C 19/00* (2013.01); *G01P 15/18* (2013.01)

(58) Field of Classification Search
CPC ......... H04L 25/03993; H04L 25/03828; H04L 43/106; B60K 35/00; B60K 2370/152; B60K 2370/589; G01C 19/00; G01P 15/18
See application file for complete search history.

(56) References Cited

U.S. PATENT DOCUMENTS

2019/0286234 A1   9/2019   Condolo

FOREIGN PATENT DOCUMENTS

WO   2018200734 A1   11/2018

OTHER PUBLICATIONS

"International Search Report and Written Opinion Issued in PCT Application No. PCT/US22/053908", dated Apr. 4, 2023, 9 Pages.

*Primary Examiner* — Nader Bolourchi
(74) *Attorney, Agent, or Firm* — Alleman Hall Creasman & Tuttle LLP

(57) ABSTRACT

A method to control an output component of an electronic system comprises (a) receiving a transmission from an input component of the electronic system, the transmission including a time stamp and at least one input signal; (b) storing content of the transmission including the time stamp and the at least one input signal; (c) selecting one of a plurality of noise-filtered signals based on the time stamp and on a reference time index, the selected one of the plurality of noise-filtered signals having a greatest signal-to-noise ratio among the noise-filtered signals defined at the reference time index; and (d) controlling an output component of the electronic system based in part on the selected noise-filtered signal.

20 Claims, 5 Drawing Sheets

1

COORDINATED COMMUNICATION IN AN ELECTRONIC SYSTEM

BACKGROUND

A complex electronic system may include plural devices and device components. In some scenarios, an electronic system may execute a control strategy that relies on temporal coordination of the data exchanged among the device components. For instance, a control component of an electronic system may be tasked with coordinating concurrent input from plural input components and providing appropriately timed output to one or more output components. However, certain factors related to noise reduction, signal transformation, and signal transmission may militate against accurate coordination of input and output signals in state-of-the-art electronic systems. Noise reduction may impart group delay to an input signal, mathematical signal transformations may impart processing delay, and signal transmission may impart a variable transmission delay, for example.

SUMMARY

One aspect of this disclosure relates to a method to control an output component of an electronic system. The method comprises (a) receiving a transmission from an input component of the electronic system, the transmission including a time stamp and at least one input signal; (b) storing content of the transmission including the time stamp and the at least one input signal; (c) selecting one of a plurality of noise-filtered signals based on the time stamp and on a reference time index, the selected one of the plurality of noise-filtered signals having a greatest signal-to-noise ratio among the noise-filtered signals defined at the reference time index; and (d) controlling an output component of the electronic system based in part on the selected noise-filtered signal.

Another aspect of this disclosure relates to an input component of an electronic system. The input component comprises an electronic sensor, a plurality of filters, a transmission buffer, and a transmitter. The electronic sensor is configured to sense a physical quantity, emitting a noise-corrupted signal that varies in dependence on the physical quantity. Each of the plurality of filters is configured to receive the noise-corrupted signal and to emit a corresponding noise-filtered signal. Each of the plurality of filters differs with respect to a degree of filtering and resulting group delay in the corresponding noise-filtered signals. The transmission buffer is configured to receive the corresponding noise-filtered signal from each of the plurality of filters and to receive a time stamp usable for estimation of transmission delay in the corresponding noise-filtered signals. The transmitter is configured to transmit the content of the transmission buffer including the time stamp and the corresponding noise-filtered signal from each of the plurality of filters.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any disadvantages noted in any part of this disclosure.

BRIEF DESCRIPTION OF THE DRAWINGS

Illustrating group delay imparted by low-pass filtering.

DETAILED DESCRIPTION

As noted hereinabove, this disclosure relates to control strategies and components of electronic systems. More particularly, it addresses the coordination of input signals from plural input components of an electronic system, which differ in latency and are received asynchronously by a control component of the electronic system. In some examples, speculative, multi-mode noise filtering is enacted at the input component, and the control component is tasked with selecting the appropriate noise-filtered signal based on the group delay of the respective input signals, the transmission delay common to the input signals, and the overall time budget for system input. The disclosed methods optimize the signal-to-noise ratio of the input signals across a range of operating conditions, for improved output control. In some examples the methods herein are applied to the projection of vehicle-locked virtual imagery on a head-mounted display (HMD) device.

Figure 1:
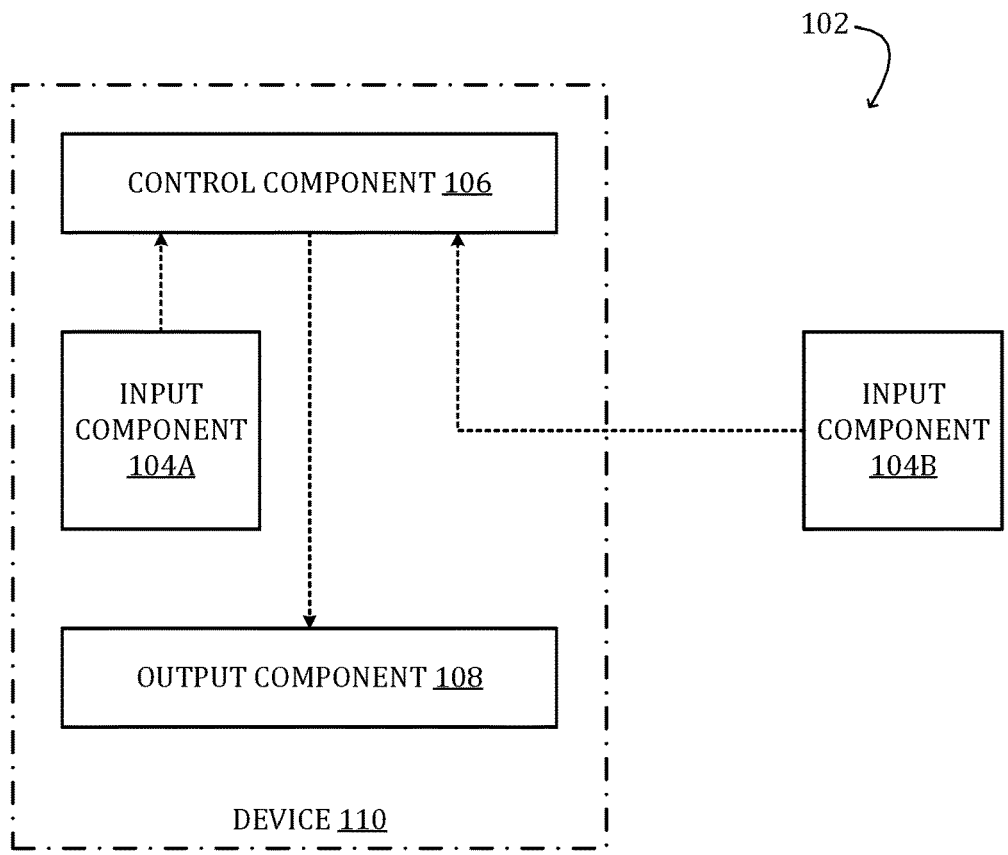
FIG. 1 shows aspects of an example system of communicatively coupled electronic components.

Turning now to the drawings, FIG. 1 shows aspects of an example system 102 of communicatively coupled electronic components. The electronic components include input components 104A and 104B, control component 106, and output component 108. In the illustrated example, control component 106, input component 104A, and output component 106 are integrated in device 110, and input component 104B is arranged outside of the device. That aspect is not strictly necessary, as various other device implementations are equally envisaged.

Control component 106 is configured to control one or more functions of output component 106 pursuant to input from input components 104. To that end, the control component receives an input signal from each of the input components and furnishes an output signal to the output component. The dashed arrows in the drawings represent input and output signals. In some examples the output component comprises an electronic display, the control component comprises a computer, and each input component comprises an electronic sensor. The control strategy in system 102 may rely on predictable synchronicity among the input and output signals, especially in examples where output component 106 is controlled in real time and where the input signals correspond to quantities measured in real time. Various factors can make it difficult, however, to provide mutually synchronized input and output signals.

One such factor is processing delay in one or more of the input components 104. In some examples an input component is configured to condition and digitize analog signal from an integrated electronic sensor. In some examples the digitized signal may be subject to additional processing before transmission to control component 106. Such additional processing may include mathematical transformations of all kinds. In some examples the overall processing delay at the input component may be significant on the timescale of the control strategy of system 102. In some examples the processing delay may be variable and unpredictable to control component 106.

Figure 2:
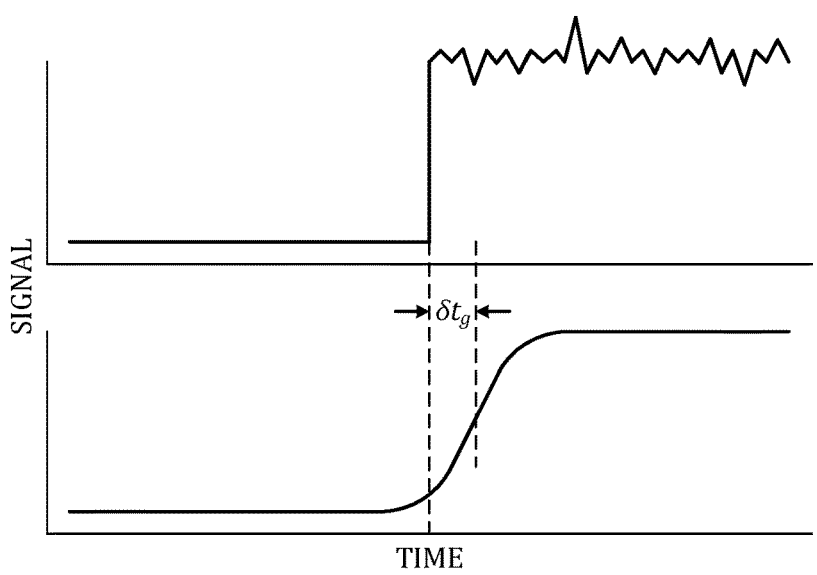
FIG. 2 is a plot of noise-corrupted and corresponding noise-filtered signals plotted versus acquisition time.

Even in systems in which the processing delays are negligible or predictable, the kind of processing applied to an input signal may introduce additional delays. For instance, when digital or analog filtering is used to suppress high-frequency noise from an electronic sensor, the filtered signal emerges delayed relative to the original sensory signal. Referred to herein as 'group delay', this effect is due to the intrinsic reduction in the temporal response of the system to the stimulus being sensed, irrespective of the manner or efficiency of the processing. In order to illustrate group delay imparted by low-pass filtering in a simple example, FIG. 2 provides a plot of noise-corrupted and corresponding noise-filtered signals versus acquisition time. In the illustrated example the sensory signal comprises a step function corrupted by random noise. The half-maximum of the noise-filtered signal is delayed relative to that of the noise-corrupted signal by $\delta t_g$. Group delay increases with decreasing cut-off frequency of a low-pass filter (or upper cut-off frequency of a band-pass filter) and may vary in dependence on other filter parameters. Control component 106 may be unable to estimate the group delay for a given input signal, therefore, unless privy to relevant filter parameters or to surrogate information. Accordingly, group delay may introduce special control challenges for systems in which noise filtering is enacted at one or more of the input components 104, with filter parameters adjusted dynamically in response to varying conditions. More generally, any type of processing that affects the temporal response function of an input component 104 may contribute to group delay.

Another factor that may affect the synchronicity of input and output signals in system 102 is transmission delay. In some examples, transmission delay may result from the capacitance or inductance of wires that carry input signal from input components 104 to control component 106. In examples in which input signals are carried wirelessly, the mode and/or protocol of wireless communication may introduce transmission delay. Like processing delay and group delay, the transmission delay may be variable and/or unpredictable by control component 106, in some examples.

From the point of view of control component 106, any unpredictable delay in the input signal S(t) received from an input component 104 introduces an error δt in time index t. This error, if it should differ among the various input signals, may upend the overall control strategy of system 102, especially in systems where the input signals represent concurrent quantities in an evolving model.

In order to address the issues summarized above, and to provide further advantages, at least one input component 104 of system 102 is configured to attach a time stamp to the input signal it transmits to control component 106. Transmitted along with the input signal, the time stamp comprises an encoded representation of the time of acquisition of the sensory data corresponding to the input signal. In some examples, the time stamp may be digitally encoded. Time-stamped input signal may be used in various ways by control component 106. For example, the control component may interpolate and/or extrapolate a time-stamped input signal to a reference time index based on two or more samples of the input signal—e.g., to synchronize input signals arriving from different input components. In other examples, input signals with different time stamps may be received and used in a global model that supports a desired control strategy.

In still other examples, control component 106 may select filter parameters to apply to a noise-corrupted input signal based on the time stamp associated with the input signal. To illustrate that approach, consider a control strategy requiring coordinated input signal from input components 104A and 104B, where input component 104B samples more frequently than input component 104A and is corrupted by high-frequency noise. In that scenario it may be desirable to filter the input signal from input component 104B as aggressively as possible, to reduce noise, subject to the constraint that the input signal is not driven so far into the past (by group delay) that it cannot be coordinated to the most recent sample from input component 104A.

In examples in which input component 104B transmits an unfiltered or minimally filtered input signal with an attached time stamp, appropriate filtering may be enacted by control component 106. To that end, the control component offsets the time stamp, relative to the time of emission of the noise-corrupted signal, by each of a series of predetermined values corresponding to the group delays of the available filters. In that manner, the control component generates a series of adjusted time indices, and may select the most aggressive filter corresponding to a time index that falls within an acceptable range of the most recent sample from input component 104A. In some examples, the time indices of the respective input signals must be close enough to enable coordination via interpolation, extrapolation, or use of a global model. In some examples, the most recent sample of the input signal from input component 104B must come before the most recent sample of the input signal from input component 104A. In other examples, an input signal may be filtered by the most aggressive filter resulting in a time index that falls within an acceptable range of a scheduled output signal.

Significantly, an analogous strategy can be enacted in systems in which one or more input components 104 is configured to transmit already filtered input signals to control component 106. In some examples input component 104B transmits N versions of the same noise-corrupted signal, filtered in N different ways. Operationally, the different versions are filtered in parallel by N different filters, each having different filter parameters, such as a different cut-off frequency. In other words, different levels of filtering are speculatively enacted preemptively and in parallel; and one of the filtered results is ultimately selected and used on the receiving end, while the others are discarded.

In one variant of this approach, input component 104B attaches a backward-adjusted time stamp to each of the N versions, taking into account the group delay for the corresponding noise-filtered signal. Control component 106 may use this time stamp without further adjustment to correct the time index of the input signal to account for processing, group, and/or transmission delays. In another variant, the input component attaches the same time stamp to all of the N versions. Based on the order in which the N versions are received, the control component associates each version to its corresponding filter and adjusts the time index for each version accordingly. In both variants, the control component then selects the most appropriate noise-filtered signal according to suitable criteria, as noted hereinabove. In some examples the selected noise-filtered signal may be the most aggressively filtered signal having a time index in a range that allows coordination to another input signal or to an output signal.

Figure 3:
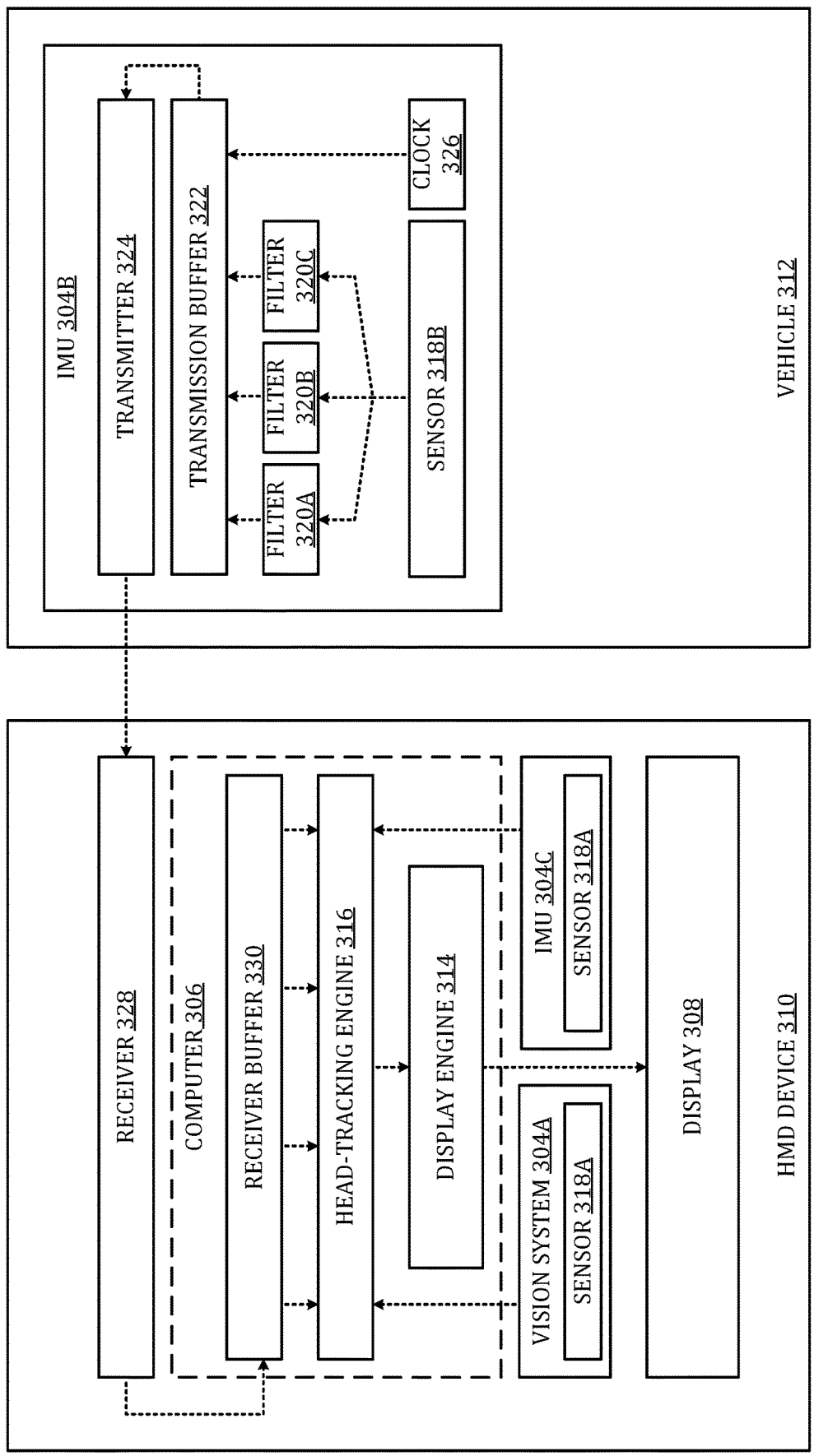
FIG. 3 shows aspects of an example head-mounted display (HMD) device and an example vehicle.

FIG. 3 illustrates a more specific, though non-limiting instantiation of the system introduced in FIG. 1. To that end, FIG. 3 shows aspects of an example head-mounted display (HMD) device 310. The HMD device is engineered to present virtual imagery positioned relative to certain frames of reference. Different frames of reference may be appropriate for different types of virtual imagery, as the following examples illustrate. Virtual imagery comprising a warning message may be 'gaze-locked'—Le., positioned relative to the wearer's focal point. Virtual imagery comprising video may be 'head-locked'—Le., positioned relative to the wearer's field of view. Virtual imagery comprising a holographic character in a game may be 'world-locked'—Le., positioned relative to a geographic frame of reference. One of the objectives herein is to enable HMD device 310 to present 'vehicle-locked' virtual imagery—i.e., virtual imagery positioned relative to the frame of reference of a moving vehicle 312. The vehicle can be a car, boat, aircraft, or other. The vehicle-locked virtual imagery may include a virtual passenger for the benefit of a lonely driver, or, a virtual tachometer on a vehicle dashboard that lacks a real tachometer. As described hereinafter, existing logic for presentation of world-locked virtual imagery may be adapted for presentation of vehicle-locked virtual imagery.

Continuing in FIG. 3, HMD device 310 includes a control component in the form of computer 306 and an output component in the form of an electronic near-eye display 308. The computer includes a display engine 314 configured to render the virtual imagery presented on the near-eye display. The computer also includes a head-tracking engine 316 configured to report the wearer's head posture and coordinates. The head-tracking engine receives concurrent input signals from various input components, including world-facing vision system 304A and inertial measurement unit (IMU) 304C. As used herein, an IMU is a device comprising a linear accelerometer and an electronic gyroscope. The linear accelerometer is configured to sense a linear acceleration vector—e.g., linear acceleration along three, mutually orthogonal axes. The electronic gyroscope is configured to sense angular velocity—e.g., as a vector of rotational velocities about three, mutually orthogonal axes. Operationally, an electronic gyroscope is also an acceleration sensor, because of the relation between angular velocity and angular acceleration. The combined output of an IMU may be referred to as a six degrees-of-freedom (6DOF) measurement. In some examples, the head-tracking engine may receive additional input from a geoposition sensor and/or other input components. In some examples the head-tracking engine may include a Kalman filter configured to parse the input signals according to a predetermined ordering.

World-facing vision system 304A includes one or more video cameras rigidly fixed to HMD device 310. Object recognition logic downstream of the video cameras is configured to identify one or more reference objects in the video and to track the reference objects from frame to frame. The world-facing vision system computes changes in the wearer's head posture and coordinates based on changes in the positions of the reference objects. The world-facing vision system emits a high-confidence, relatively high latency (~100 ms) input signal to head-tracking engine 316. In parallel, IMU 304C, also rigidly fixed to the HMD device, senses the linear acceleration and angular velocity of the HMD device, providing, in some examples, an integrable 6DOF signal to head-tracking engine 316. IMU 304C emits a relatively low latency (~10 ms) derivative signal, which, over longer timescales, may be subject to drift. Head-tracking engine 316 uses the respective input signals from world-facing vision system 304A and IMU 304C cooperatively, effectively using the IMU output to compute real-time updates of the world-facing vision-system input. In this manner the head-tracking engine maintains an evolving model that tracks the wearer's head posture and coordinates in real time. Output from head-tracking engine 316 is received in display engine 314. The display engine maintains a model of the wearer's environment including any world-locked virtual imagery to be presented on the HMD device. Using the head posture and coordinates the head-tracking engine computes appropriate geometric transformations for rendering the world-locked display imagery as it should appear in the wearer's field of view.

Two adaptations to the above control strategy enable HMD device 310 to present vehicle-locked virtual imagery. First, world-facing vision system 304A is adapted to exclude, for head-tracking, reference objects imaged through the windows of the vehicle. Second, the linear acceleration and angular velocity of the vehicle itself are subtracted from the corresponding acceleration and velocity determined by IMU 304C. To support the subtraction, vehicle 312 includes another input component in the form of IMU 304B, which is coupled communicatively to HMD device 310.

Despite the soundness of the noted adaptations, it is observed that the input signal from IMUs 304B and 304C may be subject to vehicle engine noise and/or road noise when vehicle 312 is in motion. Furthermore, in some examples wireless communication between HMD device 310 and IMU 304B is provided over a radio network (e.g., a Bluetooth or vehicle-based WiFi network). Because transmission latency must be kept to a minimum, a very lightweight network protocol is typically used. In one non-limiting example, the universal datagram protocol (UDP) is used. UDP communications may exhibit unpredictable transmission delay and/or data loss in scenarios in which the wireless network must handle additional network traffic of unpredictable volume. This factor underscores the value of filtering the input signal at the IMU, where it can be guaranteed that none of the data will be lost. Moreover, the full bandwidth of the IMU sensors can be made available to the filters, which then emit signal of significantly reduced bandwidth, thereby reducing the load on network componentry.

Continuing now in FIG. 3, each of the input components herein includes an electronic sensor 318 configured to sense a physical quantity. The electronic sensor emits a noise-corrupted signal that varies in dependence on the physical quantity. For IMUs 304 the electronic sensor is an acceleration sensor, and the physical quantity is a component of acceleration. In order to improve the signal-to-noise ratio (S/N) for acceleration sensing, each of the six outputs of IMU 304B is subject to noise filtering. To that end, IMU 304B includes a plurality of filters 320, each configured to receive the same noise-corrupted signal from sensor 318 and to emit a corresponding noise-filtered signal. The noise-corrupted signal from IMU 304B includes noise superposed on usable signal. As the frequency spectrum of the noise differs from the frequency spectrum of the usable signal, the plurality of filters may include frequency-selective filters— e.g., low-pass or band-pass filters having at least one filter parameter, such as a cut-off frequency, which determines the degree of filtering of the noise-corrupted signal. Each of the plurality of filters has a spectral response function, which is a function of the at least one filter parameter. In some examples the plurality of filters differ with respect to the at least one filter parameter, such that the spectral response functions also differ. According to the principles outlined hereinabove, the group delay increases with decreasing spectral response across the plurality of filters. Thus, the plurality of filters 320, which differ with respect to the at least one filter parameter, emit noise-filtered signals that differ with respect to group delay.

IMU 304B includes a transmission buffer 322 and a wireless transmitter 324. The transmission buffer is configured to receive a corresponding noise-filtered signal from each of the plurality of filters. In the illustrated example, the output of sensor 318 fans out in parallel to first filter 320A, second filter 320B, and third filter 320C. Noise-filtered signals from the first, second, and third filters are received in the transmission buffer, which functions as a parallel-in-serial-out buffer, providing signal content to wireless transmitter 324.

The detailed configuration of the first, second, and third filters is not particularly limited. In one example, electronic sensor 318B may emit a sensory signal of about 960 Hertz (Hz) bandwidth. First filter 320A may comprise a minimal filter configured for antialiasing, such as a second-order Butterworth low-pass filter with a cut-off frequency of about 60 Hertz ($\tau \sim 3.7$ ms). This filter may impart a group delay of 3.7 ms to the input signal. Second filter 320B may comprise a hunting notch filter with a $Q \sim 2$ notch wandering from 20 to 120 Hz (1.3 ms$<\tau<$5 ms). This filter may impart a group delay of 5 to 10 ms to the input signal. Third filter 320C may comprise a second-order Bessel-type low-pass filter with a cut-off frequency of about 20 Hz ($\tau \sim 13.7$ ms). This filter may impart a group delay of about 20 ms to the input signal.

IMU 304B includes a clock 326 configured to emit a digital time stamp reflecting the time of acquisition of sensory signal from electronic sensor 318. The time stamp is usable, downstream of the IMU, for estimation of transmission delay in the noise-filtered signals. Transmission buffer 322 is configured to receive one or more time stamps from the clock, in addition to the noise filtered signals. Transmitter 324 is configured to transmit the stored content of the transmission buffer, including the noise-filtered signal corresponding to each of the plurality of filters and the one or more time stamps. In this manner, time stamps received into the transmission buffer are attached to (i.e., integrated into) the input signal transmitted via wireless transmitter 324. In some examples the transmission buffer receives a separate time stamp corresponding to each of the plurality of filters. Clock 326 may be further configured to offset each time stamp by the group delay of the corresponding noise-filtered signal, according to a stored series of predetermined group-delay offsets. In other examples the same time stamp is associated with all of the noise-filtered signals, and the time index corresponding to each is computed on the receiving end.

Continuing in FIG. 3, wireless receiver 328 of HMD device 310 is configured to receive the transmission from IMU 304B, the transmission including one or more input signals and time stamps. Content of the transmission, including the one or more input signals and time stamps, is stored in receiver buffer 330. Head-tracking engine 316 is configured to read the stored content of the transmission from the receiver buffer. As noted above, the head-tracking engine also receives signal from additional input components—from IMU 304C and world-facing vision system 304A, for example. In some examples the most recent sample of high-latency signal from the world-facing vision system determines the reference time index to which all other head-tracking input is to be coordinated. In effect, the latency of input signal from the world-facing vision system determines the 'time budget' for any signal to be coordinated thereto. Provided that the combined processing, group, and transmission delay for the IMU output does not exceed the time budget there is no penalty for filtering, and therefore the most aggressive filter may be used.

For instance, if the current input signal from world-facing vision system 304A is based on images computed 500 ms past midnight of the current day, then input signal from a nearby time index would be desired from IMUs 304B and 304C. Now suppose that the current time is 900 ms past midnight, and that the head-tracking engine receives, from IMU 304B, a filtered input signal from first filter 320A stamped 850 ms, a filtered input signal from second filter 320B stamped 550 ms, and a filtered input signal from third filter 320C stamped 150 ms. The input signal from the third filter would require extrapolation through 350 ms to arrive at the 500 time index from the world-facing vision system. In contrast, filtered input signals from the first and second filters include data that extends through the 500 time index, such that interpolation over a short distance would enable coordination of the time indices. Of those two options, the filtered signal from second filter 320B, filtered at the lowest cut-off frequency, exhibits the highest signal-to-noise ratio. Accordingly, in this example the filtered signal from the second filter is selected by head-tracking engine 316 and used in conjunction with input signal from world-facing vision system 304A and from IMU 304C to compute the wearer's head posture and coordinates.

In other control strategies it may be desirable to coordinate a given input signal to a relatively high-latency output signal, such as the output signal that display engine 314 transmits to near-eye display 308. In such examples, the reference time index hereinabove may be a scheduled time of emission of output signal to the near-eye display.

The noise-filtering approach illustrated above can be supported in a number of ways. In some examples, selection logic of head-tracking engine 316 is configured to read one or more time stamps from receiver buffer 330 and select one of a plurality of noise-filtered signals based on the one or more time stamps and on a reference time index. The selected noise-filtered signal may be the one having greatest signal-to-noise ratio among the noise-filtered signals defined at (e.g., prior to) the reference time index. Thus, the appropriate noise-filtered signal may be selected directly from receiver buffer 330. In other examples the receiver buffer stores unfiltered or minimally filtered signal, and head-tracking engine 316 enacts the desired filtering. To that end, the head-tracking engine may comprise a plurality of filters, each configured to receive noise-corrupted signal from the receiver buffer and to emit a noise-filtered signal. As noted hereinabove, the plurality of filters may differ with respect to at least one filter parameter—viz., a degree of filtering and resulting group delay in the corresponding noise-filtered signals. In both cases, control logic of display engine 314 controls near-eye display 308 based in part on the selected noise-filtered signal.

Figure 4:
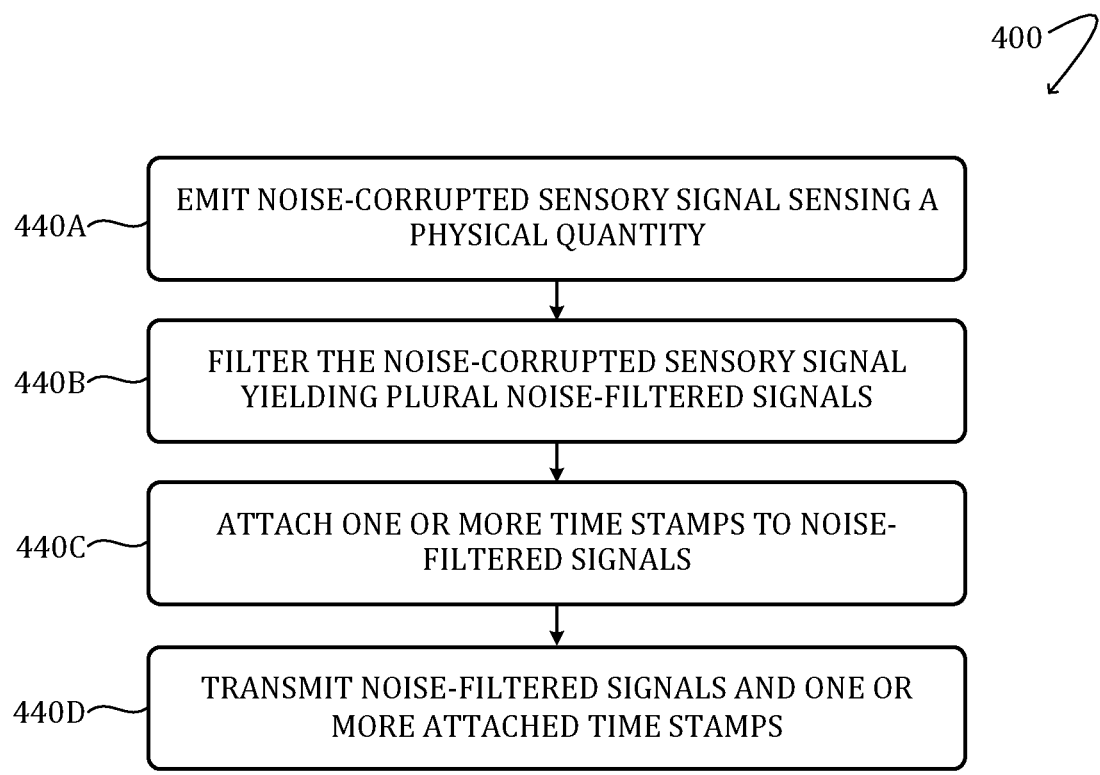
FIGS. 4 and 5 show aspects of example methods to control an output component of an electronic system.

FIG. 4 shows aspects of an example method 400 to control an output component of an electronic system. The actions illustrated in FIG. 4 are actions executed by an input component of the electronic system, such as an IMU coupled communicatively to an HMD device. For ease of understanding, the methods herein are described with continued reference to the above configurations. It will be understood, however, that the methods may be supported by other configurations.

At 440A the input component senses a physical quantity and emits a corresponding noise-corrupted sensory signal. More specifically, an electronic sensor of the input component emits a noise-corrupted signal varying in dependence on the physical quantity. In some examples, the physical quantity is a component of linear acceleration or angular velocity. In some examples, plural components of acceleration may be sensed and processed concurrently. At 440B the noise-corrupted sensory signal corresponding to the physical quantity is filtered, in parallel, by a plurality of filters provided on the input component. Each of the plurality of filters receives the noise-corrupted signal and emits a different, noise-filtered signal. The plurality of filters differ with respect to at least one filter parameter and with respect to the group delay in the emitted noise-filtered signal. In some examples, the plurality of noise-filtered signals is received in a transmission buffer of the input component. At 440C one or more time stamps are attached to the noise-filtered signals. In some examples, the one or more time stamps may be received in the transmission buffer of the input component, together with the noise-filtered signals. The time stamps reflect the time of acquisition of the noise-corrupted signal by the electronic sensor. In some examples a single time stamp is attached, which applies to all of the noise-filtered signals. In other examples a series of time stamps are attached; each time stamp in the series may be adjusted—i.e., back-dated based on the group delay corresponding to the filter used to produce the noise-filtered signal. At 440D the transmitter transmits to a control component the noise-filtered signal from each of the plurality of filters and the one or more attached time stamps.

Figure 5:
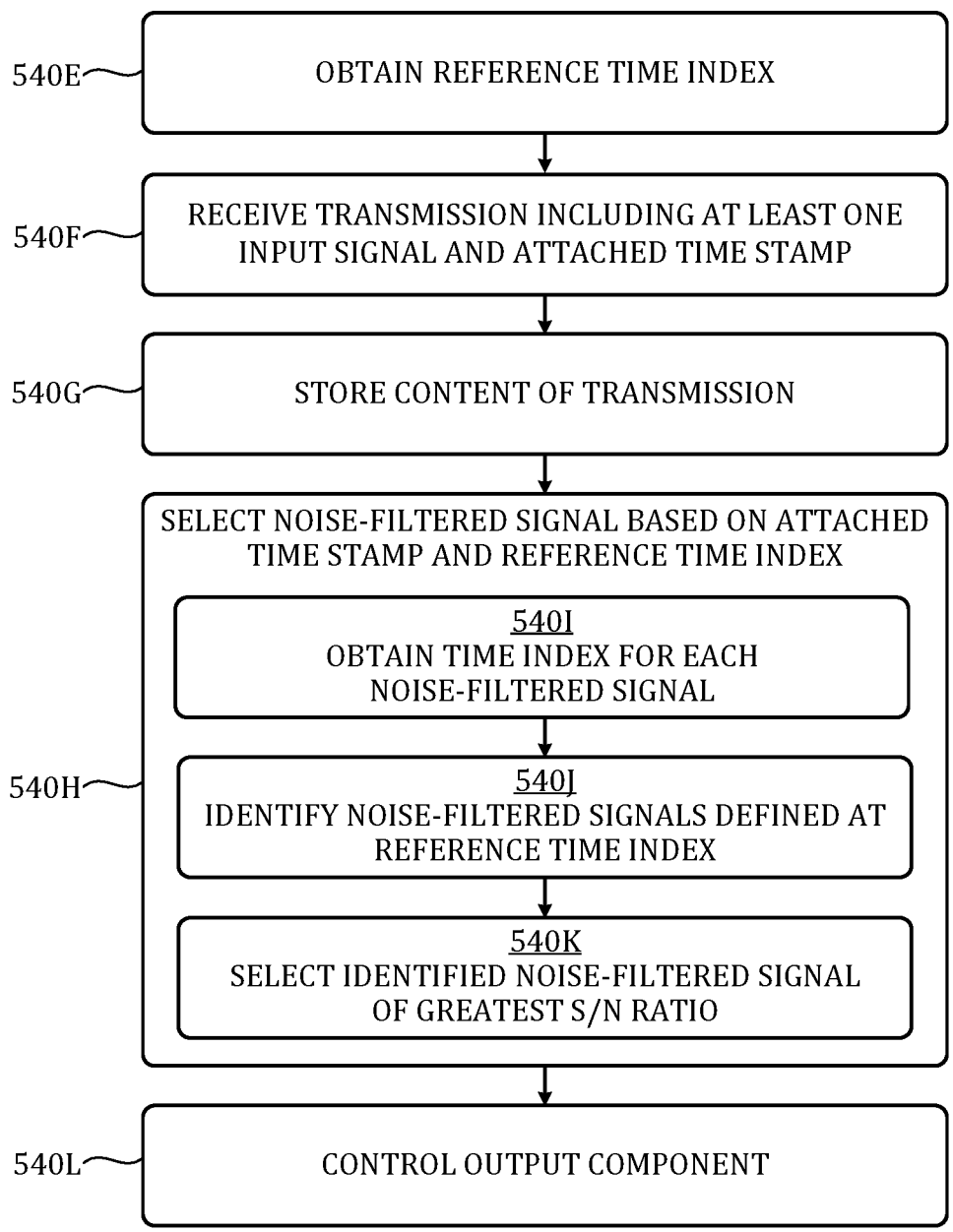

FIG. 5 shows aspects of an example method 500 to control an output component of an electronic system. The actions illustrated in FIG. 5 are actions executed by a control component of the electronic system, such as a computer of an HMD device.

At 540E the control component obtains a reference time index. In some examples, the reference time index may correspond to a time stamp received from another input component of the electronic system—e.g., a relatively high-latency input component. In other examples, the reference time index may correspond to the time of a scheduled output to an output component of the electronic system. At 540F the control component receives a transmission from an input component of the electronic system. The transmission includes at least one input signal and at least one attached time stamp. At 540G the control component stores the content of the transmission, including the at least one input signal and the at least one attached time stamp. In some examples the content is stored in a receiver buffer of the control component. At 540H the control component selects one of a plurality of noise-filtered signals based on the at least one attached time stamp and on a reference time index. In examples in which the receiver buffer stores a plurality of noise-filtered signals, the desired signal is selected based on the time index for each signal relative to the reference time index. In other words, a selection is made from among the noise-filtered signals that are defined at, or can be coordinated to, the reference time index. In the illustrated example, at 540I the control component obtains the time index for each of the plurality of noise-filtered signals, the time index being adjusted for group delay. At 540J the control component identifies one or more of the noise filtered signals that are defined at, or can be coordinated to, the reference time index. For instance, such signals may include samples that extend through the reference time index, as determined based on the attached time stamp. At 540K the control component selects the noise-filtered signal of greatest S/N ratio from among the one or more noise-filtered signals identified. At 540L the control component controls the output component of the electronic system based in part on the selected noise-filtered signal.

No aspect of the foregoing drawings or description should be interpreted in a limiting sense, because numerous variations, additions, and omissions are also envisaged. As noted above, the methods herein may be tied to a computer system of one or more computing devices. Such methods and processes may be implemented as an application program or service, an application programming interface (API), a library, and/or other computer-program product.

Figure 6:
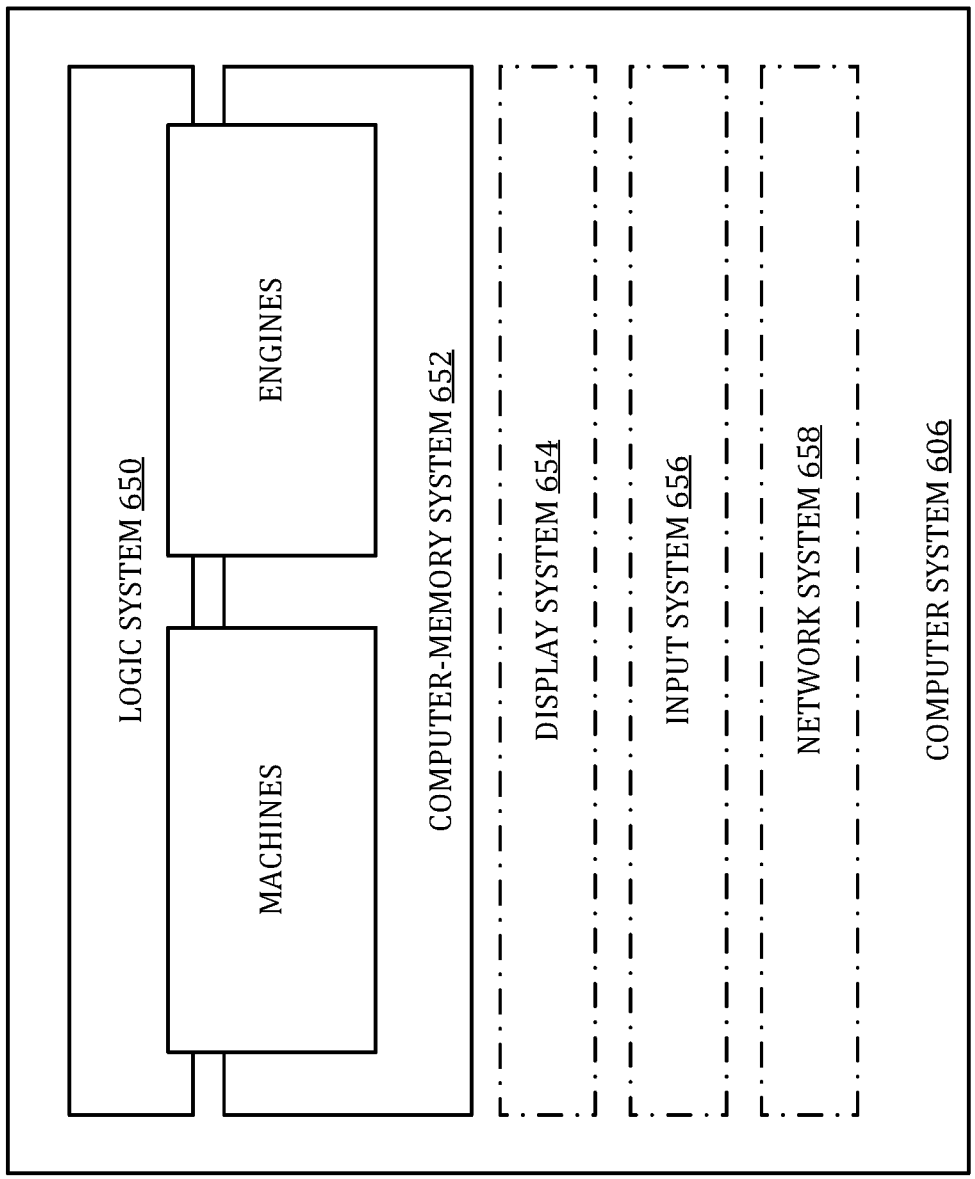
FIG. 6 shows aspects of an example computer system.

FIG. 6 provides a schematic representation of a computer system 606 configured to provide some or all of the computer system functionality disclosed herein. Computer system 606 may take the form of a personal computer, application-server computer, or any other computing device.

Computer system 606 includes a logic system 650 and a computer-memory system 652. Computer system 606 may optionally include a display system 654, an input system 656, a network system 658, and/or other systems not shown in the drawings.

Logic system 650 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 652 includes at least one physical device configured to temporarily and/or permanently hold computer system information, such as data and instructions executable by logic system 650. When the computer-memory system includes two or more devices, the devices may be collocated or remotely located. Computer-memory system 652 may include at least one volatile, nonvolatile, dynamic, static, read/write, read-only, random-access, sequential-access, location-read addressable, file-read addressable, and/or content-read addressable computer-memory device. Computer-memory system 652 may include at least one removable and/or built-in computer-memory device. When the logic system executes instructions, the state of computer-memory system 652 may be transformed—e.g., to hold different data.

Aspects of logic system 650 and computer-memory system 652 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 650 and computer-memory system 652 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines (as used throughout the above description) may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 654 may be used to present a visual representation of data held by computer-memory system 652. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 656 may comprise or interface with one or more input devices. An input device may include a sensor device or a user input device. Examples of user input devices include a keyboard, mouse, or touch screen.

When included, network system 658 may be configured to communicatively couple computer system 606 with one or more other computer systems. The network system may include wired and/or wireless communication devices compatible with one or more different communication protocols. The network system may be configured for communication via personal-, local- and/or wide-area networks.

In conclusion, one aspect of this disclosure is directed to an input component of an electronic system. The input component comprises an electronic sensor, a plurality of filters, a transmission buffer, and a transmitter. Configured to sense a physical quantity, the electronic sensor emits a noise-corrupted signal varying in dependence on the physical quantity. The plurality of filters are each configured to receive the noise-corrupted signal and to emit a corresponding noise-filtered signal, the plurality of filters differing with respect to a degree of filtering and resulting group delay in the corresponding noise-filtered signals. The transmission buffer is configured to receive the corresponding noise-filtered signal from each of the plurality of filters and to receive a time stamp usable for estimation of transmission delay in the corresponding noise-filtered signals. The transmitter is configured to transmit content of the transmission buffer including the time stamp and the corresponding noise-filtered signal from each of the plurality of filters. The time stamp provides certain technical effects related to network efficiency—viz., it enables the component receiving the transmission to estimate the time of acquisition of the noise-corrupted signal by the electronic sensor, irrespective of variable transmission delay.

In some implementations, the electronic sensor is an acceleration sensor and the physical quantity is a component of acceleration. In some implementations, the noise-corrupted signal includes noise superposed on usable signal, a frequency spectrum of the noise differs from the frequency spectrum of the usable signal, and the plurality of filters include frequency-selective filters. In some implementations, each of the plurality of filters has a spectral response, and the group delay increases with decreasing spectral response across the plurality of filters. These features provide the additional technical effect of math for a specific purpose or implementation—viz., reducing noise. In some implementations, the time stamp is one of a plurality of time stamps corresponding to the plurality of filters, and each time stamp is offset, relative to a time of emission of the noise-corrupted signal, by the group delay of the corresponding filter. This feature provides certain technical effects related to network efficiency—viz., it enables the component receiving the transmission to estimate the time of acquisition of the noise-corrupted signal by the electronic sensor, irrespective of variable group delay. In some implementations, the transmitter is a wireless transmitter exhibiting variable transmission delay. In some implementations, the input component is arranged in a vehicle.

Another aspect of this disclosure is directed to a control component of an electronic system. The control component comprises a receiver, a receiver buffer, selection logic, and control logic. The receiver is configured to receive a transmission from an input component of the electronic system, the transmission including a time stamp and at least one input signal. The receiver buffer is configured to store content of the transmission including the time stamp and the at least one input signal. The selection logic is configured to read the time stamp and to select one of a plurality of noise-filtered signals based on the time stamp and on a reference time index, the selected one of the plurality of noise-filtered signals having a greatest signal-to-noise ratio among the noise-filtered signals defined at the reference time index. The control logic is configured to control an output component of the electronic system based in part on the selected one of the plurality of noise-filtered signals. By making the selection of noise-filtered signal based on the time stamp, the control component achieves the technical effect of network efficiency—viz., filtering according to an approach that is cognizant of the transmission delay in the input signal, as well as any group delay that may potentially delay the input signal.

In some implementations, the receiver is a wireless receiver. In some implementations, the input component is a first input component, the electronic system includes a second input component, and the reference time index is a time index of signal received from the second input component. In some implementations, the first input component has a first latency, and the second input component has a second latency greater than the first latency. In some implementations, the second input component is a world-facing vision system. In some implementations, the reference time index is a scheduled time index of signal to the output component. These features provide the technical effect of reducing consumption of computing resources; in particular, the input signal from the first input component is filtered liberally within the time budget established by the latency of the second input component or by the schedule for providing output. In some implementations, selecting one of the plurality of noise-filtered signals includes selecting from the receiver buffer. In some implementations the control component further comprises a plurality of filters each configured to receive noise-corrupted signal from the receiver buffer and to emit a noise-filtered signal, the plurality of filters differing with respect to a degree of filtering and resulting group delay in the corresponding noise-filtered signals. In some implementations, selecting one of the plurality of noise-filtered signals includes: obtaining a time index of each of the plurality of noise-filtered signals, the time index being adjusted for group delay; identifying one or more of the noise-filtered signals defined at the reference time index; and selecting a noise-filtered signal of minimal noise from among the one or more noise-filtered signals identified. In some implementations, the input component is an inertial measurement unit. In some implementations, the control component is a head-mounted display device.

Another aspect of this disclosure is directed to a method to control an output component of an electronic system, the method comprising: (a) receiving a transmission from an input component of the electronic system, the transmission including a time stamp and at least one input signal; (b) storing content of the transmission including the time stamp and the at least one input signal; (c) selecting one of a plurality of noise-filtered signals based on the time stamp and on a reference time index, the selected one of the plurality of noise-filtered signals having a greatest signal-to-noise ratio among the noise-filtered signals defined at the reference time index; and (d) controlling an output component of the electronic system based in part on the selected one of the noise-filtered signals. The features of this method provide technical effects akin to those of the foregoing configurations.

In some implementations, selecting one of the plurality of noise-filtered signals includes: obtaining a time index of each of the plurality of noise-filtered signals, the time index being adjusted for group delay; identifying one or more of the noise-filtered signals defined at the reference time index; and selecting a noise-filtered signal of minimal noise from among the one or more noise-filtered signals identified.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An input component of an electronic system, the input component comprising:
    an electronic sensor configured to sense a physical quantity, the electronic sensor emitting a noise-corrupted signal varying in dependence on the physical quantity;
    a plurality of filters each configured to receive the noise-corrupted signal and to emit a corresponding noise-filtered signal, the plurality of filters differing with respect to a degree of filtering and resulting group delay in the corresponding noise-filtered signals;
    a transmission buffer configured to receive the corresponding noise-filtered signal from each of the plurality of filters and to receive at least one time stamp usable for estimation of transmission delay in the corresponding noise-filtered signals; and
    a transmitter configured to transmit content of the transmission buffer including the at least one time stamp and the corresponding noise-filtered signal from each of the plurality of filters.

2. The input component of claim 1 wherein the electronic sensor is an acceleration sensor and the physical quantity is a component of acceleration.

3. The input component of claim 1 wherein the noise-corrupted signal includes noise superposed on usable signal, wherein a frequency spectrum of the noise differs from the frequency spectrum of the usable signal, and wherein the plurality of filters include frequency-selective filters.

4. The input component of claim 1 wherein each of the plurality of filters has a spectral response, and wherein the group delay increases with decreasing spectral response across the plurality of filters.

5. The input component of claim 1 wherein the at least one time stamp is one of a plurality of time stamps corresponding to the plurality of filters, and wherein each of the plurality of time stamps is offset, relative to a time of emission of the noise-corrupted signal, by the group delay of the corresponding filter.

6. The input component of claim 1 wherein the transmitter is a wireless transmitter exhibiting variable transmission delay.

7. The input component of claim 1 wherein the input component is arranged in a vehicle.

8. A control component of an electronic system, the control component comprising:
    a receiver configured to receive a transmission from an input component of the electronic system, the transmission including a time stamp and at least one input signal;
    a receiver buffer configured to store content of the transmission including the time stamp and the at least one input signal;
    selection logic configured to read the time stamp and to select one of a plurality of noise-filtered signals based on the time stamp and on a reference time index, the selected one of the plurality of noise-filtered signals having a greatest signal-to-noise ratio among the noise-filtered signals defined at the reference time index; and control logic configured to control an output component of the electronic system based in part on the selected one of the plurality of noise-filtered signals.

9. The control component of claim 8 wherein the receiver is a wireless receiver.

10. The control component of claim 8 wherein the input component is a first input component, the electronic system includes a second input component, and the reference time index is a time index of signal received from the second input component.

11. The control component of claim 10 wherein the first input component has a first latency, and the second input component has a second latency greater than the first latency.

12. The control component of claim 10 wherein the second input component is a world-facing vision system.

13. The control component of claim 8 wherein the reference time index is a scheduled time index of signal to the output component.

14. The control component of claim 8 wherein selecting one of the plurality of noise-filtered signals includes selecting from the receiver buffer.

15. The control component of claim 8 further comprising a plurality of filters each configured to receive noise-corrupted signal from the receiver buffer and to emit a noise-filtered signal, the plurality of filters differing with respect to a degree of filtering and resulting group delay in the corresponding noise-filtered signals.

16. The control component of claim 8 wherein selecting one of the plurality of noise-filtered signals includes:
    obtaining a time index of each of the plurality of noise-filtered signals, the time index being adjusted for group delay;
    identifying one or more of the noise-filtered signals defined at the reference time index; and
    selecting a noise-filtered signal of minimal noise from among the one or more noise-filtered signals identified.

17. The control component of claim 8 wherein the input component is an inertial measurement unit.

18. The control component of claim 8 wherein the control component is a head-mounted display device.

19. A method to control an output component of an electronic system, the method comprising:
    receiving a transmission from an input component of the electronic system, the transmission including a time stamp and at least one input signal;
    storing content of the transmission including the time stamp and the at least one input signal;
    selecting one of a plurality of noise-filtered signals based on the time stamp and on a reference time index, the selected one of the plurality of noise-filtered signals having a greatest signal-to-noise ratio among the noise-filtered signals defined at the reference time index; and
    controlling an output component of the electronic system based in part on the selected one of the noise-filtered signals.

20. The method of claim 19 wherein selecting one of the plurality of noise-filtered signals includes:
    obtaining a time index of each of the plurality of noise-filtered signals, the time index being adjusted for group delay;
    identifying one or more of the noise-filtered signals defined at the reference time index; and
    selecting a noise-filtered signal of minimal noise from among the one or more noise-filtered signals identified.

\* \* \* \* \*